Jan. 18, 1927.
B. D. BRODKEY
SAFETY DEVICE FOR CLUTCHES
Filed August 21, 1926
1,615,005
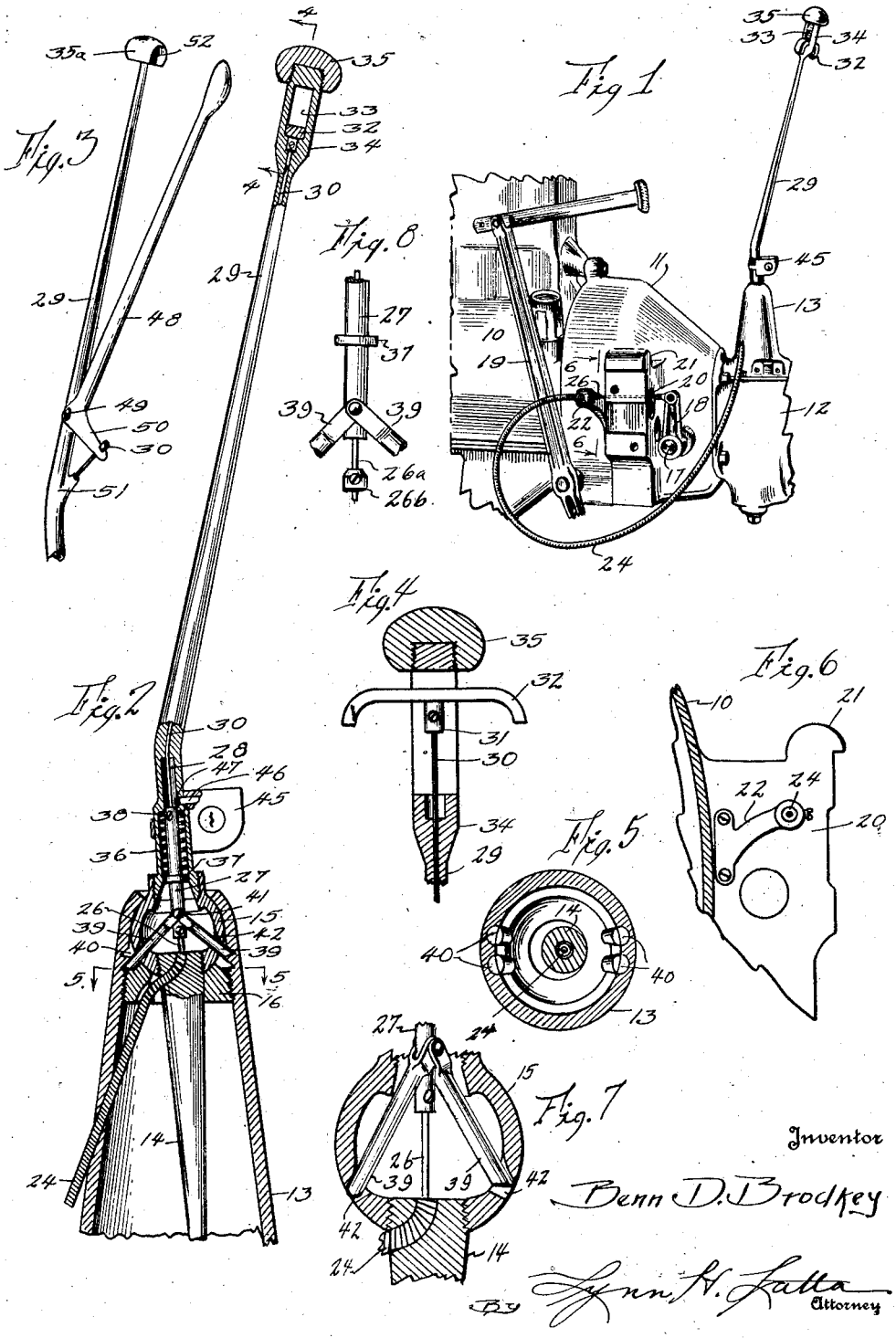

Patented Jan. 18, 1927.

1,615,005

UNITED STATES PATENT OFFICE.

BENN D. BRODKEY, OF SIOUX CITY, IOWA.

SAFETY DEVICE FOR CLUTCHES.

Application filed August 21, 1926. Serial No. 130,735.

My invention relates to a control mechanism for the automobile and it is my purpose to provide means whereby the ordinary clutch may be operated from the gear shift lever instead of the clutch pedal ordinarily employed.

More particularly, it is my object to provide a control arrangement including means for locking the gear shift lever in any of its selective positions and further to prevent the release of said locking means while the clutch is engaged.

A further object is to synchronize the release of the clutch with the release of the gear shift lever locking means, both functions being accomplished by the same means.

A still further object is to provide an auxiliary key lock for co-operating with the common releasing means for the gear shift lever lock and the clutch in such a way that both the gear shift lever and clutch may be absolutely locked against manipulation, when it is desired to lock a vehicle embodying my invention during the absence of driver. By thus locking an automobile in reverse gear, for instance, and simultaneously locking the clutch against release the vehicle may be so locked that it can be neither driven nor towed in a forward direction.

With these and other objects in view, my invention consists in the arrangement and combination of the various parts of my device, whereby the objects contemplated are attained, as hereinafter more fully set forth, pointed out in my claims, and illustrated in the accompanying drawings, in which:

Fig. 1 is a perspective view of a portion of the engine and transmission of an automobile embodying my invention.

Fig. 2 is an enlarged view partly in section and partly in elevation of the gear shift lever locking means, key lock and actuating mechanism.

Fig. 3 shows a somewhat modified form of the actuating mechanism.

Fig. 4 is a detail sectional view taken on line 4—4, Fig. 2.

Fig. 5 is a detail sectional view taken on the line 5—5 of Fig. 2.

Fig. 6 is a detail sectional view taken on line 6—6 of Fig. 1.

Fig. 7 is an enlarged detail sectional view illustrating the clutch lever locking mechanism in released position.

Fig. 8 is a view of a slightly modified form of a portion of the actuating mechanism.

I have used the reference character 10 to indicate generally the engine of an automobile. In the rear of the engine is the fly wheel housing 11 to which is secured the transmission case 12, provided with the gear shift lever casing 13.

The usual gear shift lever arm 14 is provided at its upper end with a ball 15 pivoted in the socket formed by the upper end of the casing 13 and a nut 16 which is threaded into the casing as shown.

The ordinary clutch release shaft is shown at 17 in Fig. 1 and the usual clutch arm 18 is shown secured thereto. The brake lever is shown at 19 and ordinarily a similar lever is employed to actuate the clutch arm 18, being connected thereto by a link extending through the opening 20 in the engine bracket 21.

In the practice of my invention the clutch pedal is entirely removed and a bracket 22 is secured to the engine bracket 21. The end of the bracket 22 is aligned with the opening 20 and is provided with an opening 23 to receive the end of a flexible steel conduit 24. A set screw 25 secures the conduit in place.

The conduit 24 is extended to the casing 13, is passed through the side wall thereof near the lower extremity of the casing and thence is extended upwardly toward the center of the ball 15 and is projected into the ball through the upper end of the arm 14 as shown in Fig. 2. A flexible steel wire 26 extends through the conduit 24 and at one end is secured to the clutch arm 18, being passed through the opening 20 for that purpose.

The other end of the wire 26 is secured to a pin 27 slidably mounted in a tubular cavity 28 in the lower end of the gear shift lever arm 29. To the upper end of the pin 27 is secured a second flexible wire 30 which extends through a central bore in the lever 29 to the upper end of the lever where it is secured in a boss 31 of a handle member 32. The handle 32 is slidably mounted in a slot 33 formed in an enlargement 34 of the lever 29 and to the upper end of the portion 34 flush with the upper extremity of the slot 33 is secured the usual gear shift lever knob 35. (Fig. 4.)

The bore 28 is enlarged as at 36 for a portion of its length and the pin 27 is provided with an integral collar 37 between which and the shoulder at the upper extremity of the enlargement 36 is received a spring 38.

The spring 38 serves to maintain the pin 27 in its normal position at its lower extent of movement. This lower extent of movement is determined by the engagement of the locking bolts 39 with slots 40 formed in the wall of the casing 13. The bolts 39 are pivoted at 41 to the pin 27 and are extended through openings 42 in the ball 15 which serve to guide them and maintain them in proper position.

When the pin 27 is in its normal position at its lower extent of movement the wire 26 will have been moved to a position allowing the clutch arm 18 to move to inoperative position relative to the clutch mechanism; that is, when the actuating mechanism including the handle 32, the wires 26 and 30 and the pin 27 and spring 38 is in the position shown in Fig. 2 the clutch will be engaged and the ordinary clutch release spring (not shown) will have moved the lever 18 rearwardly to the position shown in Fig. 1.

By grasping the gear shift lever, the palm of the hand engaging the knob 35 and the fingers extending downwardly and under the handle 32 and thence drawing the handle 32 upwardly toward the knob 35, the pin 27 will simultaneously draw the locking bolts 39 inwardly within the ball 15 and away from engagement with the notches 40 and also draw the lever 18 forwardly to compress the clutch spring and actuate the clutch release mechanism.

When this has been done the gear shift lever may be moved from its former position to any of the other selective positions and handle 32 then released. Upon releasing the handle 32 the bolts 39 will enter another set of slots, locking the gear shift lever against movement and simultaneously allowing the clutch to re-engage. It will be noted in Fig. 2 that there are two vertically spaced sets of notches 40 and it will be seen by reference to Fig. 5 that each of these vertically spaced sets of notches comprises two horizontally spaced pairs. Thus there is a pair of notches to receive the bolts 39 in each position of the gear shift lever.

A key lock 45 is secured to the lever 29 and has a locking bolt 46 extending just above the upper extremity of the pin 27 in its normal position.

By actuating the key lock with the proper key the bolt 46 may be thrown inwardly across the path of sliding movement of the pin 27 and thereby prevent the pin being drawn upwardly. The actuating mechanism for the clutch and gear shift lever is thus locked against manipulation and may be so locked in any position of engagement of the gears which is desired. The most effective method of locking the car is to shift to reverse and thence lock the actuating mechanism. In order to tow the car it would be necessary to move the floor boards and press the lever 18 forwardly and in order to drive the car under its own power it would be necessary to drive it backwardly.

With some clutches the hand lever of the handle 32 may not give sufficient leverage to conveniently actuate the clutch and consequently in such a case the actuating mechanism shown in Fig. 3 may be substituted for that shown in Fig. 4. This modified form of actuating mechanism comprises a clutch lever 48 pivoted at 49 to the gear shift lever 29 and provided with a bell crank arm 50 in the end of which is secured the upper end of the wire 30. The wire 30 extends into the gear shift lever through a boss 51.

A cavity 52 in the knob 35ª of the gear shift lever receives the end of the clutch lever 48 so that while shifting gears the two levers may be telescoped together to form in effect a single letter.

The advantages of my invention are thought to be obvious. With the use of a control mechanism such as I have just described, it is impossible to shift gears without first having released the clutch and thus the danger of stripping gears and the wear upon the gears is greatly reduced. The arangement insures the proper synchronism of clutch and gear shift lever actuation. It does away with the use of a foot pedal and makes it possible to actuate the brake pedal with the left foot leaving the right foot free at all times for manipulation of the foot throttle. This is especially advantageous in starting up hills.

The arrangement further allows a very simple method of simultaneously locking both the clutch and gear shift lever with the addition of only a key lock to the combination.

It will be understood that the wire 26 may be attached to some other portion of the clutch release mechanism than the lever 18, for instance, the wire might be attached directly to the ordinary clutch pedal or it might be extended within the fly wheel housing and attached to the clutch release yoke which is shown in the drawings. The words "clutch release actuating member" used in the claims will be therefore understood to refer to any portion of the clutch release mechanism to which the wire 26 might be attached.

In some cases it may be necessary to increase the range of movement of the handle beyond that necessary to operate the locking bolts for the gear shift lever, in order to effectively actuate the clutch.

This may be done by extending the wire 26ª entirely through the sliding pin as shown in Fig. 8 and securing a collar 26ᵇ to the wire below the pin in such a position that when the handle 31 is moved upwardly the clutch will be first partially released and then the collar 26ᵇ will engage the pin to release the locking bolts.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In an automobile control mechanism, a selective gear shift lever, a casing member in which said lever is socketed, a clutch release actuating member, a handle carried by the gear shift lever in position to be grasped together with the lever, and a flexible element secured to the handle, extending longitudinally through the gear shift lever, and secured to said clutch release actuating member, said flexible element being encased by a flexible, non-compressible, tube secured at one end in the gear shift lever near its socket.

2. In an automobile control mechanism, a selective gear shift lever, a casing member in which said lever is socketed, a clutch release actuating member, a handle carried by the gear shift lever in position to be grasped together with the lever, an element connecting said handle with the clutch release actuating member, to transmit pressure exerted upon said handle to said member, locking means carried by the gear shift lever and cooperating with the casing member, said locking means being connected to and actuated by said element.

3. In an automobile control mechanism, a selective gear shift lever, a casing member in which said lever is socketed, a clutch release actuating member, a handle carried by the gear shift lever and an element connecting said handle with the clutch release actuating member, to transmit pressure exerted upon said handle to said member, locking means carried by the gear shift lever and cooperating with the casing member, said locking means being connected to and actuated by, said element, toward unlocking position when said member is actuated and an auxiliary key lock adapted to coact with said element to prevent its being moved in a direction to actuate the clutch release actuating member.

4. In a vehicle control mechanism, a selective gear shift lever, a clutch release actuating member, a handle carried by the gear shift lever, a mechanical non-resilient link connecting said handle with the clutch release actuating member to directly transmit pressure exerted upon said handle to said member, and means for locking the gear shift lever in any of its selected positions, said means being released from locking engagement by said element.

5. In a vehicle control mechanism, a selective gear shift lever, a clutch release actuating member, a handle carried by the gear shift lever, a mechanical non-resilient link connecting said handle with the clutch release actuating member to directly transmit pressure exerted upon said handle to said member and means for locking the gear shift lever in any of its selected positions, said means being engaged by a portion of the connecting link after the movement of said link has commenced to release the clutch.

6. In a vehicle control mechanism, a selective gear shift lever, a clutch release actuating member, a handle carried by the gear shift lever in position to be grasped together with the lever and a flexible element secured to the handle extending longitudinally through the gear shift lever and secured to said clutch release actuating member for transmitting pressure exerted upon said handle to said member.

Signed at Sioux City, in Woodbury county, State of Iowa, this 17th day of August, 1926.

BENN D. BRODKEY.